Patented Nov. 17, 1925.

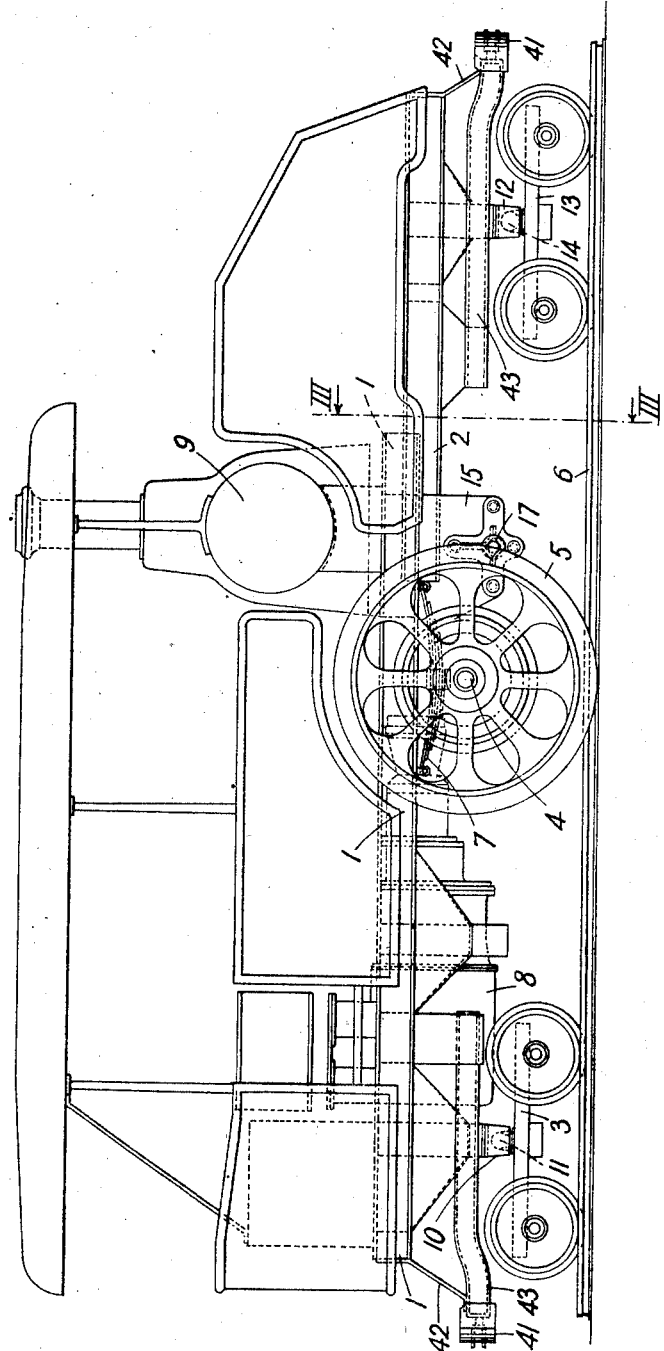

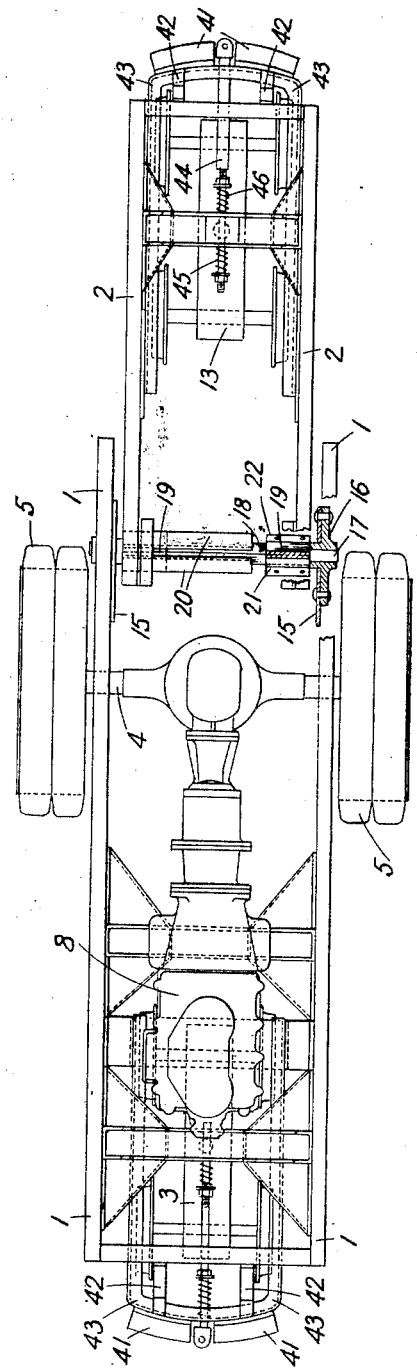

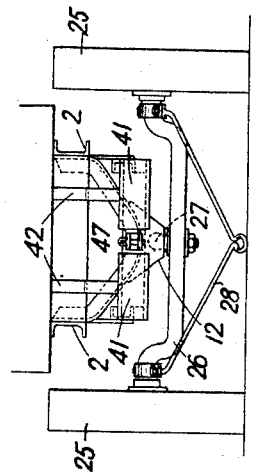
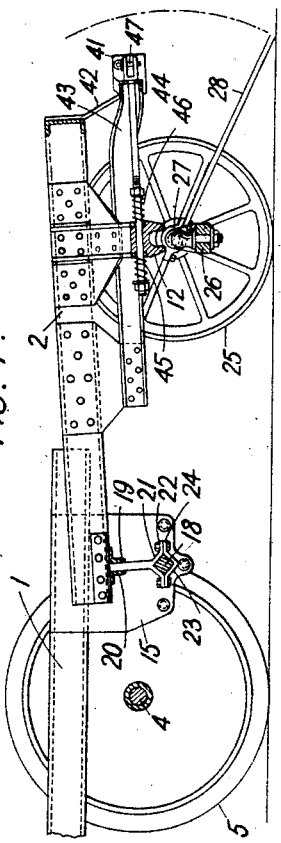
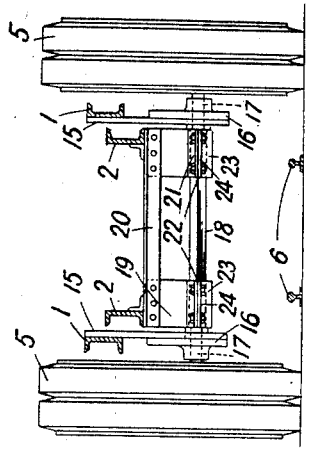
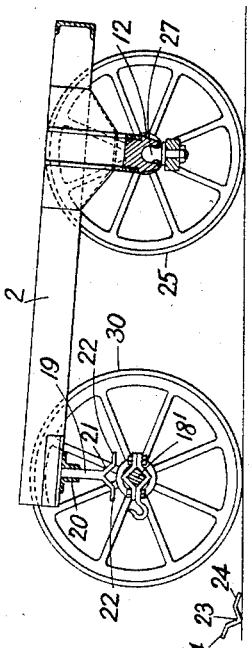

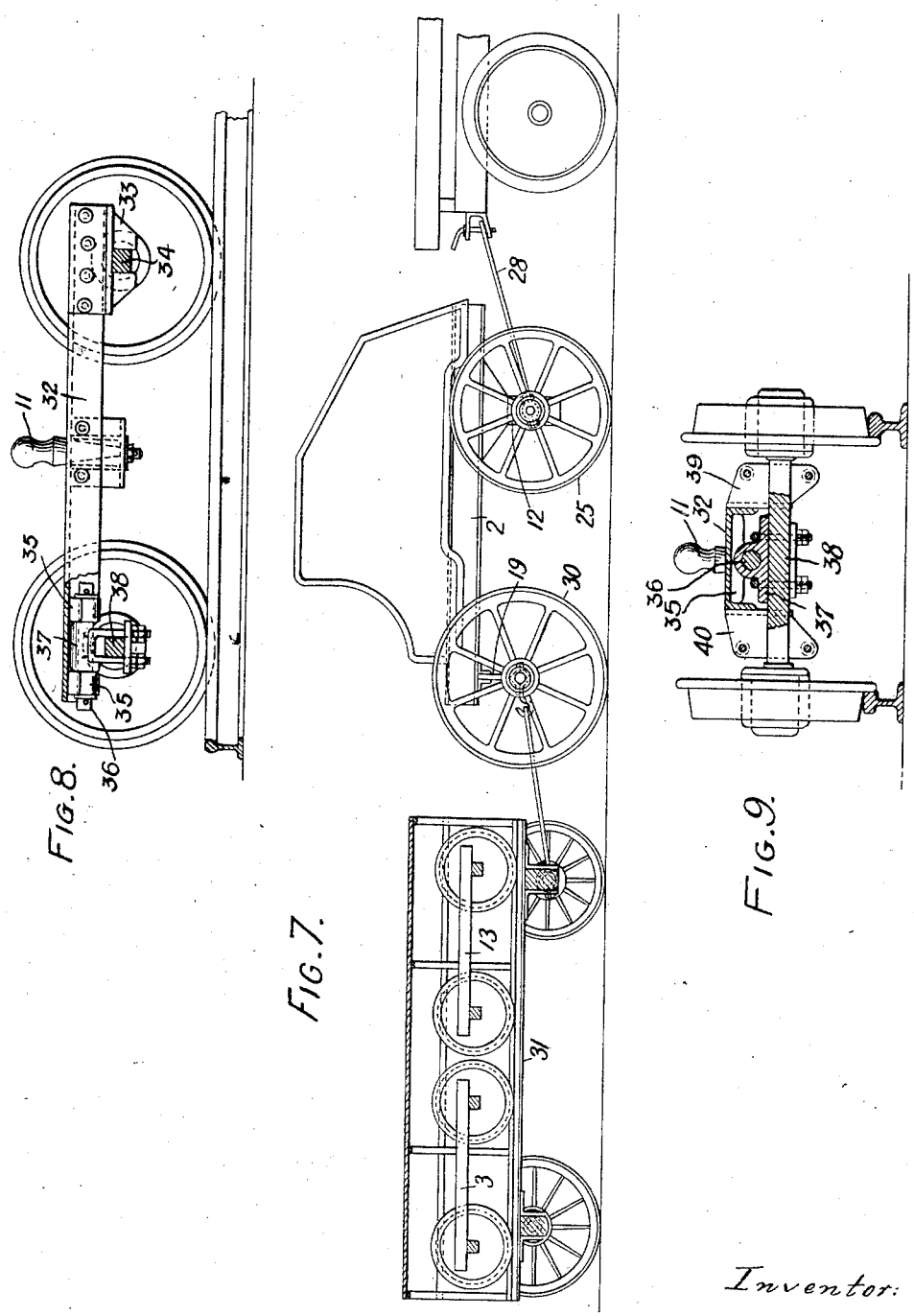

1,561,510

UNITED STATES PATENT OFFICE.

FRANK HENRY DUTTON, OF JOHANNESBURG, TRANSVAAL, SOUTH AFRICA, ASSIGNOR TO ROADRAILS LIMITED, OF WEMBLEY HILL, MIDDLESEX, ENGLAND, A BRITISH COMPANY.

VEHICLE FOR SERVICE ON ROADS AND RAILS.

Application filed May 7, 1925. Serial No. 28,701.

*To all whom it may concern:*

Be it known that I, FRANK HENRY DUTTON, a British subject, residing at Marlbank, Hendon Street, Yeoville, Johannesburg, Transvaal Province, Union of South Africa, have invented certain new and useful Improvements in Vehicles for Service on Roads and Rails (for which I have filed an application in Great Britain No. 10,804, filed May 1, 1924), of which the following is a specification.

This invention concerns improvements in or relating to power propelled vehicles or locomotives for service on roads and rails and is applicable with particular advantage to vehicles of the type illustrated for example, in my prior Patents Nos. 1,306,051 and 1,416,625, granted June 10, 1919, and May 16, 1922, respectively.

In connection with road and rail vehicles of the reversible tractor type, that is with a road driving axle in the centre and a rail bogie at each end, it is of importance to provide a construction affording a large amount of flexibility both in the vertical and lateral direction, yet enabling vertical movements to be localized when running over inequalities. Moreover, since such reversible vehicles are relatively heavy and not infrequently have to be transported by road, it is also important to provide a construction enabling the tractor to be readily disassembled into more easily transportable units, and to provide means enabling the tractor units to be readily moved on road wheels, say from the workshop to rail wagon or from rail wagon to the narrow gauge line the tractor has to operate on, or for transfer of any other kind.

An object of the invention is to provide a locomotive or tractor which is flexible in the manner described and which has its parts constructed and arranged so as to be readily divisible into more or less independent units and to enable the assembling of these units to be effected quickly and with ease and so adapting the units and to provide means as to enable them likewise with ease to be separately convertible into road units for their transport on any ordinary road. A further object is to provide an improved bogie construction which ensures contact of all four wheels with the rails without the usual interposition of springs or the use of a spring frame.

The invention is illustrated by way of example, as applied to a reversible road and rail tractor having a rail bogie forward and a rail bogie aft both ball-jointed to the chassis and a single pair of road driving wheels arranged substantially centrally to run on a road outside of the rail track.

Fig. 1 represents a broadside view of the tractor with the omission, however, of all such parts as could be readily dispensed with without impairing the understanding of the invention.

Fig. 2 is a top plan view of the chassis of the tractor shown in Fig. 1 illustrating, however, part of the articulation of the frame units in section.

Fig. 3 is a transverse section on the line III—III of Fig. 1.

Fig. 4 illustrates in longitudinal section of the chassis the operation of replacing the rear rail bogie by a road wheel unit, and Fig. 5 illustrates in a similar view the disconnection of the articulation and the application of a road wheel unit also at this point.

Fig. 6 is a front view of the road wheel unit after its substitution for the bogie viewed from the right hand side of Fig. 4, and Fig. 7 shows the rear frame section shown in Fig. 5, and including the tank thereon shown in Fig. 1, converted into a road unit and coupled to the rear end of a lorry and the accommodation of the rail bogies in a separate road van coupled thereto for road transport.

Figs. 8 and 9 illustrate respectively in a lateral and a front view partly in section a rail bogie constructed according to this invention.

The whole of the body structure of the tractor is as shown, supported on a substantially continuous chassis or frame which in the instance illustrated, is composed of two sections 1 and 2 arranged as nearly as possible in one horizontal plane.

The section 1 is supported at its forward end on a rail bogie 3 and at an intermediate point near its rear end on the driving axle 4. This axle carries a pair of road driving wheels 5 which in the example shown, are arranged to straddle the track 6 and to run on the roadway outside of the rails. Like most vehicles of this type these wheels are shod with solid rubber tyres, but it will be understood by those versed in the art that a driving unit of the endless track type may be employed in their stead or several pairs of driving wheels may be used and the running could be also inside the track, that is to say, between the rails or one wheel could run inside and the other outside thereof as may be required. The frame section 1 is supported on the driving axle 4 by means of the usual springs 7 appropriately fitted to the underside of the frame. The axle 4 may be driven by any type of engine which may be used alone or in conjunction with an electric generator to provide auxiliary power if necessary, a steam engine 8 supplied from a boiler 9 being by way of example indicated in the drawings, the driving connections to the axle 4 being of any well known type. The support of the frame section 1 on the forward bogie 3 includes in a well known manner a socket member 10 provided with a central spherical cavity adapted to receive a ball headed pin 11 mounted centrally on the bogie frame, thus providing universal flexibility between the bogie and the tractor body. The frame section 2 has its forward end flexibly articulated to the rear end of the frame unit 1, and is supported near its end on a rear bogie 13 by a similiar ball and socket connection 12, 14 to provide for universal flexibility also at this end of the tractor.

The articulation employed between the frame units 1 and 2 according to this invention, comprises in its preferred form two plates or hangers 15 one on each side securely attached to the inside of the lateral components of the frame unit 1 as best shown in Fig 3. Securely fitted to the outer faces of these hangers are bearings 16. These bearings are constructed to receive the two cylindrical ends or trunnions 17 of a square axle 18, so that the flats thereof are at an angular inclination of 45° to the horizontal. The axle is preferably arranged in line with the draw bar pins 47 to ensure that no lift takes place during the progress of traction. The axle 18 is employed to support the forward end of the frame unit 2, and for this purpose one or two brackets 19 are as shown, securely bolted to the transverse brace 20 connecting the longitudinal frame components 2 so as to form part of the frame unit 2. The lower ends of these brackets, as clearly seen in Fig. 4, are forked and angularly off set at 21 to form an inverted V-shaped groove adapted to engage the two upper sides of the axle 18 and provided with flanges 22. They, therefore, rest on the axle 18 in the correct position and are preferably secured thereto by a V-shaped plate 23 which fits the under flats of the axle 18, and is provided with flanges 24 enabling it to be screwed to the flanges 22 or connected thereto in any convenient manner. These parts being assembled in the manner described cause the frame sections 1 and 2 to be automatically drawn correctly to register; enabling, therefore, the assembling and disassembling manipulation to be readily effected by unskilled labour.

The articulation above described is as will be seen, of economical construction and ensures automatically accurate alignment of the frame sections 1 and 2, and when the tractor is traveling over obstacles or negotiating irregularities or gradients, permits the distribution of weight as provided for to remain unchanged and causes the maximum movement to be localized to that portion of the tractor passing over the inequality. It enables, moreover, as will likewise be clear, the rear section 2 to render the driving unit of the vehicle on frame section 1 practically independent of the rear unit, and to perform oscillating movements in a vertical direction, while at the same time being prevented from performing any independent lateral oscillations relatively thereto.

The above articulation has, however, been designed also for the purpose of enabling the units of the tractor frame when disassembled to be readily converted into road units for their ready transport along any ordinary road. This is accomplished by the provision of special road wheel units the preferable form and application of which are illustrated in Figs. 4–7. The road carriage shown for use more particularly as a substitute for the rail bogie comprises two wheels 25 mounted on an axle 26 which is cranked down and has centrally secured to it a ball headed pin 27, the centre of which lies slightly below the centre of its road wheels. This road carriage is also fitted with a drawbar or shaft 28 for animal or motor traction.

When it is desired or necessary to transfer the tractor by road, the articulation 18 is first diconnected. The frame section 1 carrying the driving axle 4 of the tractor may then first be transferred by simply jacking up the forward rail bogie end of the tractor and withdrawing the rail bogie 3, fitting in its place the road carriage unit before mentioned, the ball headed pin 27 on the road carriage being brought to register with the cavity in the socket member 10, whereafter by lowering the frame section 1 the ball and socket are caused to engage, and the driving portion 1, 4, 5, supporting the main machinery of the tractor may then be transported by road as desired. The centre of the ball pin 27 on the road carriage being below the centre of the road wheels ensures full stability during transportation, and avoids any necessity for a fifth wheel, turntable or other device usually required for that purpose.

Similarly the non-driving unit 2 supporting the tank 29 can be readily transported by road with the aid at its rear end of a similar road carriage unit 25 taking the place of the rear rail bogie 13 as shown most clearly in Figs. 4, 5, and 6, and at its forward end of a road wheel unit to replace the support normally formed by its connection to the frame section 1. To this end it is only necessary to replace the axle 18 which forms part of the hangers 15 on the frame section 1 by a similarly shaped axle 18′ of a pair of temporary road wheels 30 by simply clamping it between the plate members 21 and 23 as indicated on the left hand side of Fig. 5. The axle 18′ also carries, but permanently clamped thereto in a similar way, a hook or hooks 30′ to which other vehicles, such as the van 31 (Fig. 7) can be coupled. In this way, therefore, the unit 2 has become converted into a true road vehicle which may be connected by means of the drawbar 28 to an ordinary lorry, the rear part of which is indicated in Fig. 7. The rail bogies 3 and 13 thus detached are then accommodated in a suitable van 31 (see Fig. 7) and hitched on to either the non-driving unit 2 as indicated or to the driving unit 1 to form a trailer, and the whole of the parts and components of the tractor are then transferred by road to any desired place. For re-converting the units into a road and rail vehicle the road carriage units 25 and 30 are then rapidly replaced by the rail bogies and the frame sections 1 and 2 assembled by the articulation described, whereupon the reversible road rail tractor is at once ready for use on its track.

Referring to Figs. 8 and 9, rail bogies employed on reversible tractors of this kind in preference to four wheel bogies of the usual type should be of a construction enabling the usual interposition of springs or the use of a spring frame to be dispensed with. For this purpose the bogie frame is formed from a straight longitudinal piece of channel iron 32, and by means of suitable brackets 33 the one axle 34 or sleeve thereof is properly secured thereto. At the other end of the bogie frame two members 35 forming part of the pivotal connection or hinge of the other axle 38 are attached and carry a hinge pin 36 lying horizontally and in the longitudinal centre line of the bogie frame. Registering with these two hinge members 35 is the complementary hinge 37 attached to the axle 38, thus giving the freedom of movement desired. Guides or brackets 39, 40 are fixed to the bogie frame to relieve the hinge members and hinge pin of lateral stresses. It will be seen that either wheel of axle 38 can rise or fall and yet at the same time each wheel will always take its apportioned load, thus preventing derailment and uneven running.

Figs. 1, 2, and 4 show also a preferable buffer and drawbar gear that may conveniently be used on vehicles of this type. In this case the buffer head 41 is not properly spring mounted but fixed by braces 42 to the requisite end of the chassis (since it is not intended to come into use when the tractor is coupled with the trucks) and mounted on the outer end of a U-shaped strap 43 projecting parallel with and below the chassis. The drawbar 44 extending through the transverse under structure is preferably fitted with springs 45, 46 (Figs. 2 and 4) to operate when either pulling or pushing, and the connection between this drawbar 44 and the truck drawbar is a bar having an eyepiece for connection with the drawbar 44 such as by a pin 47 indicated in Fig. 4 or in any other well known manner.

This arrangement of a buffer has the advantage of enabling all slack in the train and consequent jolting and damage to goods and the rolling stock, to be almost entirely obviated. With ordinary locomotives considerable slack is necessary for the engine to start one truck after another, while with a road and rail type vehicle, the load can be started with all couplings in a more or less tight condition. In addition the usual constant rubbing of the buffer parts and consequent wear and tear thereof resulting at times in derailment are entirely obviated.

I claim:

1. A power driven reversible locomotive for service on roads and rails having driving means for running on the road and a rail bogie at each end, and composed of readily separable units each constructed to be separately convertible into a road unit for transport on ordinary roads.

2. In a reversible locomotive for service on roads and rails, the combination of two frames substantially aligned with one another and so jointed to one another as to be readily separable and to be capable of relative vertical movement, driving means for running on the road, and a rail bogie at each end.

3. A reversible locomotive for service on roads and rails, the combination of a frame, driving means thereon adapted for running on the road, power generating apparatus for operating the driving means, and a rail bogie on the frame, a second frame articulated to the first mentioned frame, and a rail bogie on said second frame.

4. In a reversible locomotive for service on roads and rails, the combination of a frame, driving means thereon adapted for running on the road, a rail bogie so connected to the frame as to be readily detachable therefrom, a second frame articulated to the first named frame at the opposite end from the said rail bogie, and a rail bogie so connected to the second frame as to be readily detachable therefrom.

5. In a reversible locomotive for service on roads and rails, the combination of a frame, driving means thereon adapted for running on the road, a rail bogie so connected to the frame as to be readily detachable therefrom, a second frame articulated to the first named frame for vertical movement only, and a rail bogie so connected to the second frame as to be readily detachable therefrom.

6. In a reversible locomotive for service on roads and rails, a unit comprising a frame, driving means adapted for running on the road and a rail bogie, a second unit comprising a frame and a rail bogie, and a transverse pin joint whereby said units are coupled to one another.

7. In a reversible locomotive for service on roads and rails, a unit comprising a frame, driving means adapted for running on the road, and a rail bogie, a second unit comprising a frame and a rail bogie, and means for joining the frames comprising complementary rotatable parts and complementary parts upwardly tapered and thereby adapted for readily positioning the units during assembly.

8. In a reversible locomotive for service on roads and rails, a unit comprising a frame, driving means adapted for running on the road, and a rail bogie, and a second unit comprising a frame and a rail bogie, a transverse axle rotatably mounted on one frame and having a polygonal portion, and clamping means on the other frame shaped to fit said polygonal portion.

9. The combination of a locomotive unit comprising a frame, driving means adapted for running on the road, and a seating, a second unit comprising a frame and a seating, track bogies constructed for attachment to said seatings, road wheel carriages similarly constructed for attachment to said seatings, a further road wheel carriage, and means on the second unit for rigidly securing the said further road wheel carriage.

10. The combination of a locomotive unit comprising a frame provided with a ball socket and driving means adapted for running on the road, a second unit comprising a frame, a ball socket, and means for disconnectibly articulating it to the first named unit, rail bogies having balls for connection with the ball sockets, two-wheeled road units each having a cranked axle with a ball for connection to the ball sockets, and a two-wheeled road unit having an axle, the articulating means being constructed for the attachment of the axle thereto.

11. The combination of a locomotive unit comprising a frame, driving means adapted for running on the road, a rail bogie, and a road wheel carriage, the frame, rail bogie and road wheel carriage being constructed to enable the rail bogie and road wheel carriage to be readily assembled with the frame in substitution for one another, a second unit comprising a frame, and interchangeable rail bogie and road wheel carriage as in the first mentioned unit, and means on the second unit for articulating it to the first unit, said means also providing a connection for a road wheel unit.

In testimony whereof I affix my signature.

FRANK HENRY DUTTON.